US012639919B2

(12) United States Patent
Bowden, Jr. et al.

(10) Patent No.: US 12,639,919 B2
(45) Date of Patent: May 26, 2026

(54) SYSTEM AND METHOD FOR IDENTIFICATION OF FEATURES IN IMAGES OBTAINED BY DRONE INSPECTIONS

(71) Applicant: Chevron U.S.A. Inc., San Ramon, CA (US)

(72) Inventors: Larry A. Bowden, Jr., Houston, TX (US); James Geoffrey Price, Houston, TX (US); Daniel Stephen Sauceda, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 675 days.

(21) Appl. No.: 18/069,880

(22) Filed: Dec. 21, 2022

(65) Prior Publication Data

US 2024/0212318 A1      Jun. 27, 2024

(51) Int. Cl.
  G06V 10/764      (2022.01)
  G06V 20/17      (2022.01)
(52) U.S. Cl.
  CPC ............ G06V 10/764 (2022.01); G06V 20/17 (2022.01)
(58) Field of Classification Search
  CPC ......... G06N 3/045; G06N 3/08; G06N 3/047; G06N 3/088; G06N 20/00; G06N 3/0475; G06N 3/0455; G06N 3/084; G06N 3/094; G06N 3/044; G06N 3/096; G06N 3/09; G06N 7/01; G06N 20/20; G06N 3/02; G06N 3/04; G06N 3/0464; G06N 20/10; G06N 3/006; G06N 3/0442; G06N 3/0499; G06N 5/01; G06N 5/022; G06N 5/04; G06V 10/82; G06V 10/774; G06V 10/764; G06V 10/761; G06V 10/40; G06V 20/46; G06V 20/70; G06V 20/20; G06V 20/52; G06V 10/7715; G06V 10/776; G06V 20/41; G06V 10/25; G06V 20/49; G06V 10/806; G06V 2201/07
  See application file for complete search history.

(56) References Cited

U.S. PATENT DOCUMENTS

2023/0068103 A1*    3/2023    Zhou ..................... G06F 16/583

OTHER PUBLICATIONS

Tiu, E., Talius, E., Patel, P. et al. Expert-level detection of pathologies from unannotated chest X-ray images via self-supervised learning. Nat. Biomed. Eng 6, 1399-1406 (Year: 2022).*
(Continued)

*Primary Examiner* — Alex Kok S Liew
(74) *Attorney, Agent, or Firm* — Marie L. Clapp

(57)      ABSTRACT

A method is described for automatic creation of image classifiers using unannotated data. The method may include receiving a CLIP model configured to generate images from text; using the CLIP model to generate images of pump jacks and images of oil pools; providing the training pairs comprising the images of pump jacks and the text "pump jack" and the images of oil pools and the text "oil pool" to a classification model; and training the classification model using the training pairs for contrastive learning to generate a refined model. The refined model may be used to classify images provided by drones to identify possible oil pools. The method is executed by a computer system.

12 Claims, 6 Drawing Sheets

(56)  References Cited

OTHER PUBLICATIONS

Stability.AI, "Stable Diffusion Public Release," Stable Diffusion Public Release—Stability.AI, Retrieved on Dec. 15, 2022 at https://stability.ai/blog/stable-diffusion-public-release.

Ekin Tiu, et al., "Expert-level detection of pathologies from unannotated chest X-ray images via self-supervised learning," Nature Biomedical Engineering, Aug. 4, 2022.

* cited by examiner

Prompt = "An zoomed out aerial satellite image of <pump-jack> and <oil-pool> on ground"

PRIOR ART

Image generated by open source model. Does not contain oil pool or pump jack.

Image generated by trained model. Contains oil pool and pump jack.

Example drone image

Iterative denoising step

SYSTEM AND METHOD FOR IDENTIFICATION OF FEATURES IN IMAGES OBTAINED BY DRONE INSPECTIONS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for identification of features in images obtained by drone inspections.

BACKGROUND

The traditional way of creating an image classifier involves a large amount of data that is manually labeled and annotated by humans. This can be a time-consuming and labor-intensive process, making it difficult and expensive to create accurate image classifiers. Automated drone inspections from gathered images/video have limited value due to poor performance of image classifiers to identify items/areas of concern.

There exists a need for a method for improved identification of features in images obtained by drone inspections.

SUMMARY

In accordance with some embodiments, a method of training a model to identify oil pools near pump jacks including receiving a CLIP model configured to generate images from text; using the CLIP model to generate images of pump jacks and images of oil pools; providing the training pairs comprising the images of pump jacks and the text "pump jack" and the images of oil pools and the text "oil pool" to a classification model; and training the classification model using the training pairs for contrastive learning to generate a refined model is disclosed. This new technology allows for the automatic creation of image classifiers using unannotated data. This is possible because the technology is able to learn and understand the characteristics of different images and then use this knowledge to accurately classify new images without the need for human input. The method may also include providing images obtained by drones to the refined model; providing a text prompt to the refined model; and generating, via the refined model, probability scores that the images match the text prompt. The method may use Stable Diffusion and/or CheXzero models.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
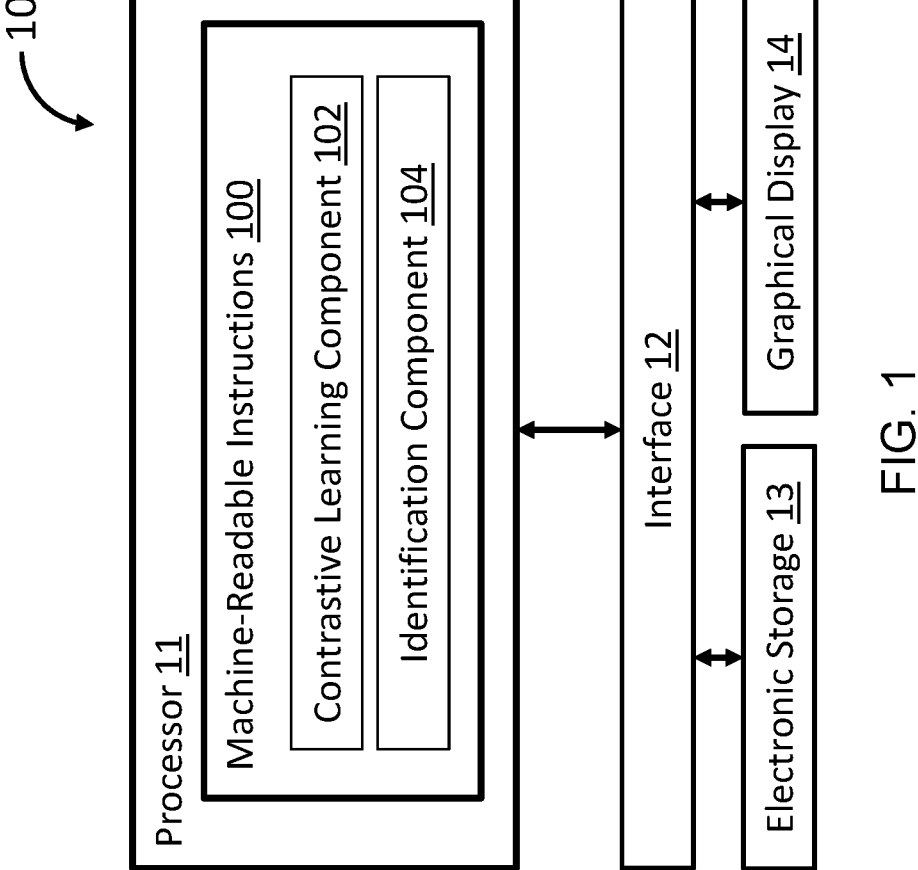
FIG. 1 illustrates an example system for identification of features in images obtained by drone inspections.

Described below are methods, systems, and computer readable storage media that provide a manner of identification of features in images obtained by drone inspections.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The traditional way of creating an image classifier involves a large amount of data that is manually labeled and annotated by humans. This can be a time-consuming and labor-intensive process, making it difficult and expensive to create accurate image classifiers. In recent years, however, advances in machine learning and artificial intelligence have made it possible to create image classifiers without the need for human annotations and labels.

This new technology allows for the automatic creation of image classifiers using unannotated data. This is possible because the technology is able to learn and understand the characteristics of different images and then use this knowledge to accurately classify new images without the need for human input.

This presents a significant opportunity for businesses and organizations that rely on image classification. By using this technology, they can create accurate image classifiers quickly and inexpensively, allowing them to improve their operations and better serve their customers. Additionally, the ability to create image classifiers without human annotations and labels also opens up new possibilities for research and development in a variety of fields.

The methods and systems of the present disclosure may, in part, use one or more models that are machine-learning algorithms. These models may be self-supervised. Self-supervised algorithms learning algorithms are trained using unlabeled data. By way of example and not limitation, self-supervised learning algorithms may include contrastive learning algorithms. Although the present disclosure may name specific models, those of skill in the art will appreciate that any model that may accomplish the goal may be used.

Contrastive learning is a self-supervised machine-learning technique that learns the general features of a dataset by teaching the model which data points are different or similar. As the model learns which pairs of data points are similar or different, it determines the high-level features about the data. In an embodiment, the contrastive learning may use image-text pairs. The contrastive learning model itself does not attempt to perform classification or segmentation.

The present invention modifies the Stable Diffusion models that generate images from text to fine-tune them with new concepts. For example, the method can add the concept "pump jack" to the model with a few images of pump-jacks, or any other hydrocarbon infrastructure such as pipelines. Also, the method can add the concept of "oil pool" to the fine-tuned model with "pump jack" to create a model that understands "pump jacks" and "oil pools" which can then be used to generate artificial data. In an embodiment, the present invention then trains a model such as the CheXzero model to create the ability to diagnose oil pools from images/video. This process removes the need for labeled data and only requires 5-50 images that contain example concepts/objects (pump jacks, oil pools) of interest to simulate. Natural language descriptions of the images are generated programmatically from image captioning models and the desired objects/concepts used to create the image. The solution is general and can be extended to any process that uses images for diagnosis.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a graphical display 14, and/or other components.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to drone images or videos, and/or other information. The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

The graphical display 14 may refer to an electronic device that provides visual presentation of information. The graphical display 14 may include a color display and/or a non-color display. The graphical display 14 may be configured to visually present information. The graphical display 14 may present information using/within one or more graphical user interfaces. For example, the graphical display 14 may present information relating to drone images or videos, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate identification of features in images obtained by drone inspections. The machine-readable instructions 100 may include one or more computer program components. The machine-readable instructions 100 may include a contrastive learning component 102, an identification component 104, and/or other computer program components.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 100, the contrastive learning component 102 may be configured to train a machine-learning model such as the CheXzero to diagnose oil pools and pump jacks in images or videos. The Stable Diffusion model creates images with desired features by identifying features in the images available. CheXzero builds the classification model from the available and generated images with the desired features (leak versus non leak). For example, the inputs to Stable Diffusion are a group of images for each feature: 5 images of leaks, 5 images of non-leaks. The Stable Diffusion model will generate an additional 500 images of leaks and non-leaks. The CheXzero model input is the group of 505 leak and non-leak images to train a robust image classifier.

The identification component 104 may be configured to use the contrastive learning model to identify user-specified features in drone images or videos. For example, this uses the trained CheXzero model.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

Figure 2B:
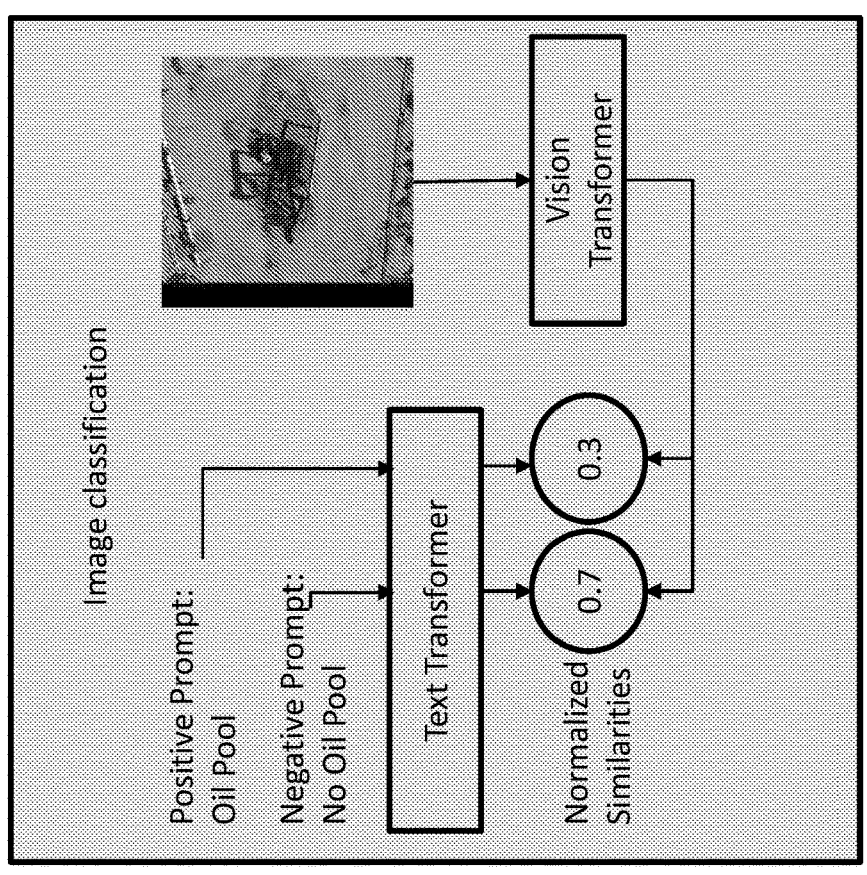
FIG. 2B illustrates part of an example method for identification of features in images obtained by drone inspections.
Figure 2A:
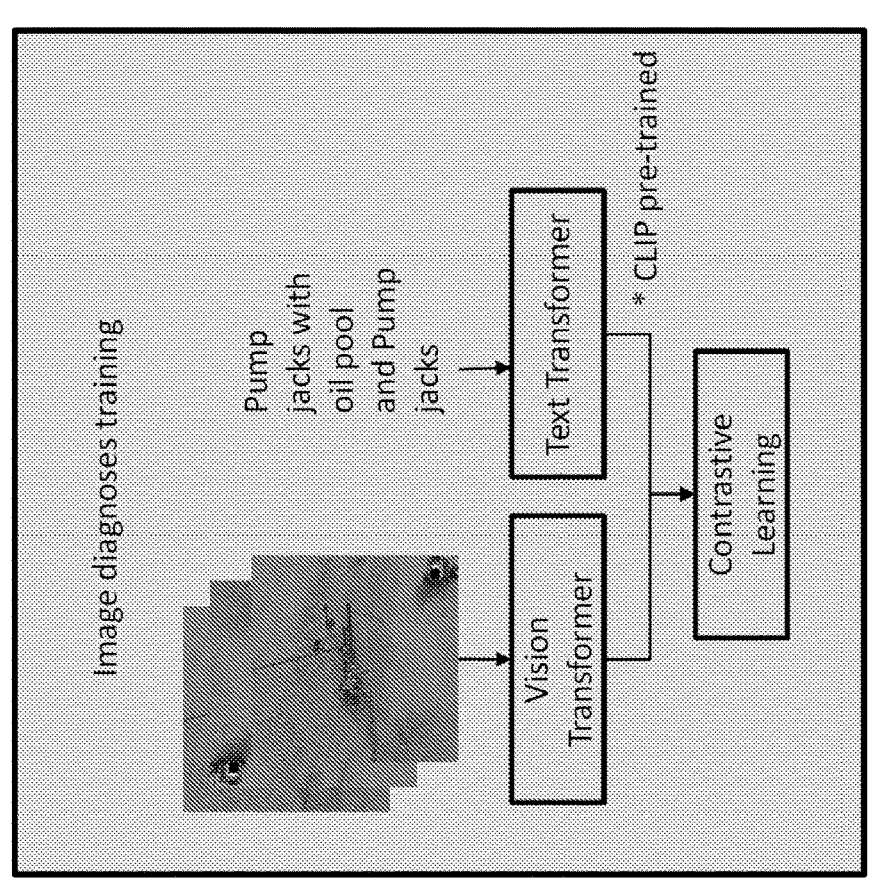
FIG. 2A illustrates part of an example method for identification of features in images obtained by drone inspections.
Figure 5:
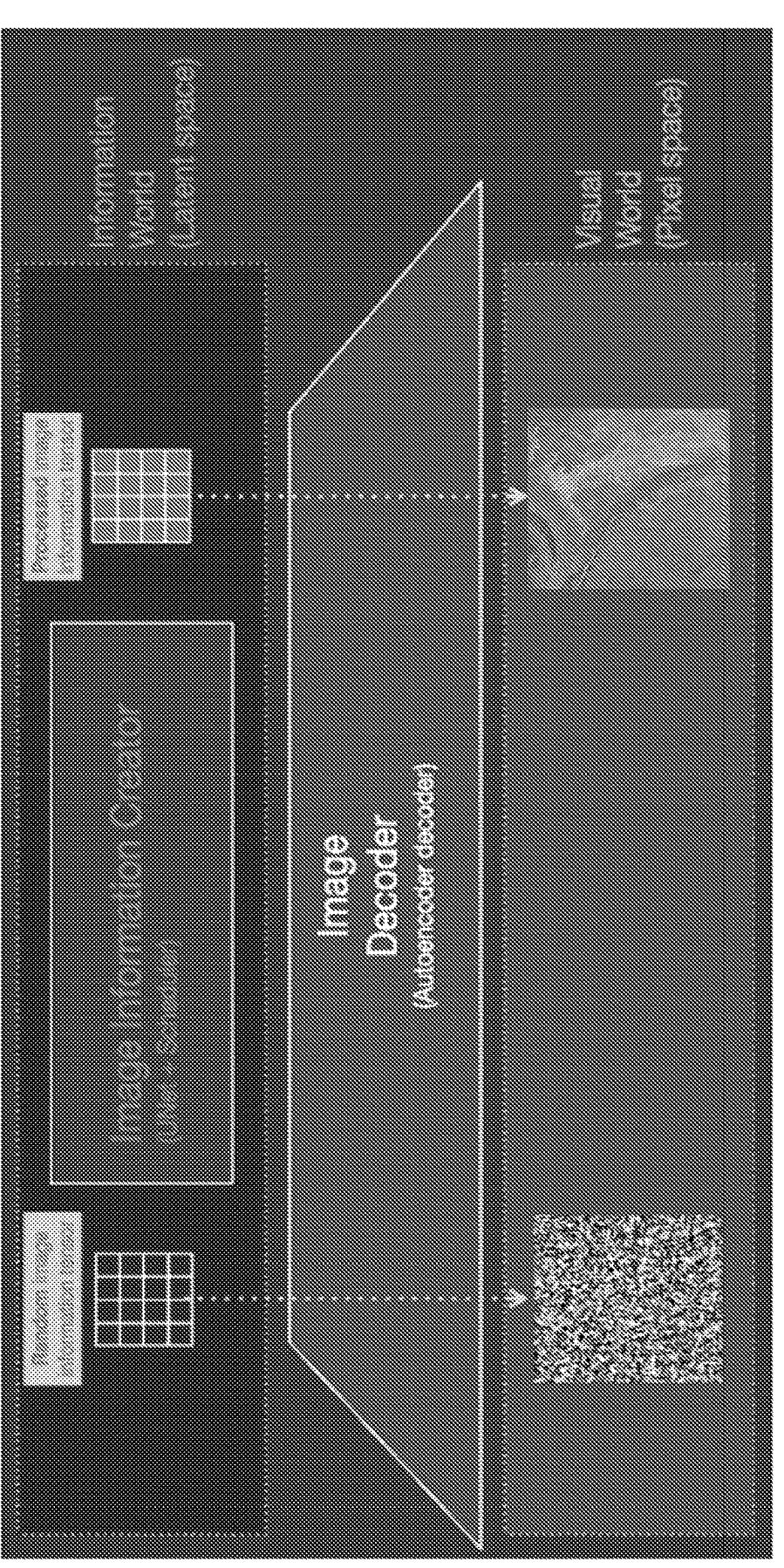
FIG. 5 illustrates an image generation architecture.
Figure 6:
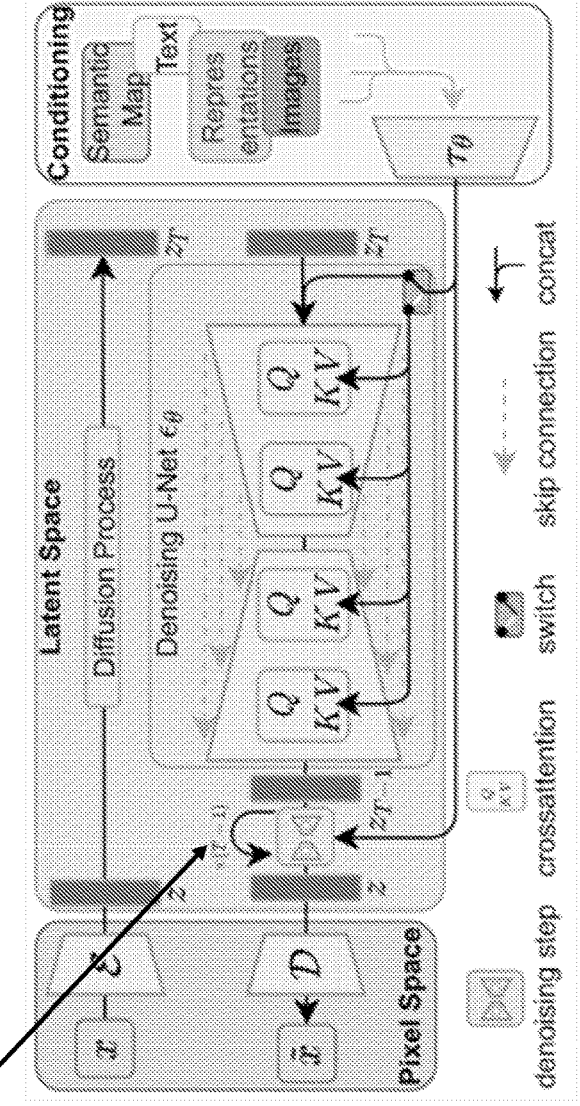
FIG. 6 illustrates a Stable Diffusion process.
Figure 7:
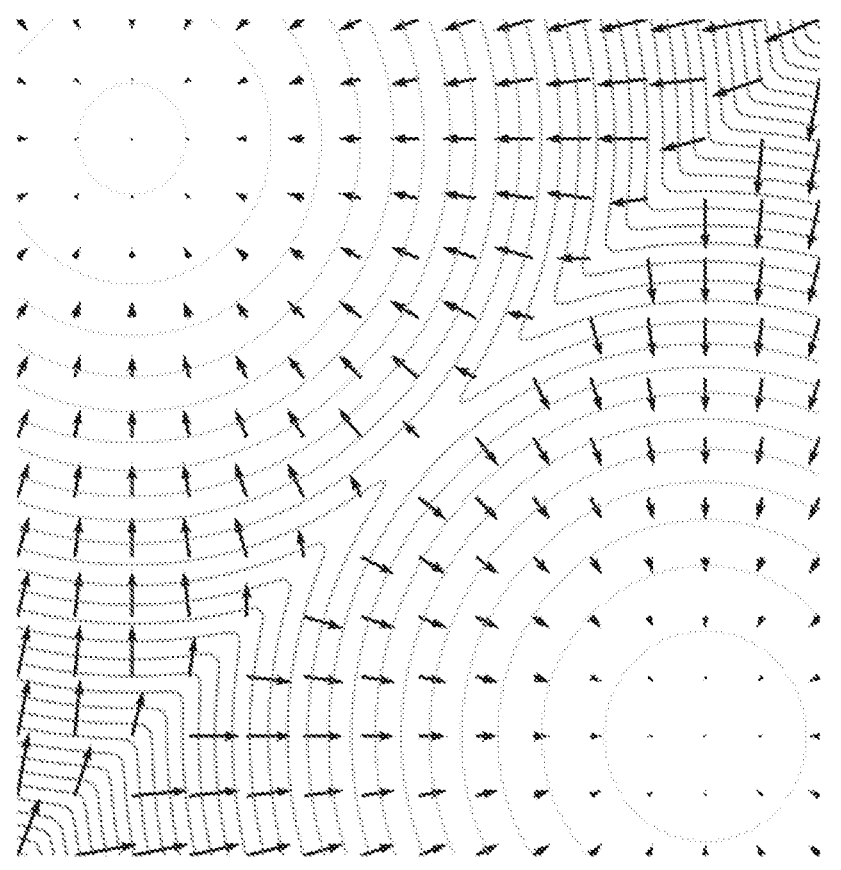
FIG. 7 illustrates a score function for an embodiment.

FIG. 2A illustrates an example process for training a model using self-supervising machine-learning. A CLIP (Contrastive-Image Pre-training) model such as Stable Diffusion creates images with desired features by identifying features in the images available. CheXzero builds the classification model from the available and generated images with the desired features (leak versus non leak). The inputs to Stable Diffusion are a group of images for each feature: 5 images of leaks, 5 images of non-leaks. The model will generate an additional 500 images of leaks and non-leaks. The CheXzero model input is the group of 505 leak and non-leak images to create a robust image classifier. In this example, a few examples of drone images are provided to a vision transformer. The model itself is a CLIP guided diffusion model. The CLIP model is a vector representation of words. The vision transformer is a combination of a Unet model plus a noise scheduler along with an image decoder (autoencoder decoder). The architecture for the Stable Diffusion image generator is illustrated in FIG. 5, the Stable Diffusion model design is in FIG. 6, and the score function is in FIG. 7 (the score function (vector field) and density function (contours) are a mixture of two Gaussian distributions). The text that describes the drone images, "pump jacks with oil pool and pump jacks," is sent to a text transformer. The vision transformer is the RESNET transformer with these modifications: 3 stem convolutions instead of 1, an average pool instead of a max pool, performs anti-aliasing strided convolutions by prepending the average pool to convolutions, the final pooling layer is a QKV attention instead of an average pool. The code for the model design may be, for example,

```
def __init__(self, layers, output_dim, heads, input_resolution=224, width=64):
    super( ).__init__( )
    self.output_dim = output_dim
    self.input_resolution = input_resolution
    # the 3-layer stem
    self.conv1 = nn.Conv2d(3, width // 2, kernel_size=3, stride=2, padding=1, bias=False)
    self.bn1 = nn.BatchNorm2d(width // 2)
    self.conv2 = nn.Conv2d(width // 2, width // 2, kernel_size=3, padding=1, bias=False)
    self.bn2 = nn.BatchNorm2d(width // 2)
    self.conv3 = nn.Conv2d(width // 2, width, kernel_size=3, padding=1, bias=False)
    self.bn3 = nn.BatchNorm2d(width)
    self.avgpool = nn.AvgPool2d(2)
    self.relu = nn.ReLU(inplace=True)
    # residual layers
    self._inplanes = width # this is a *mutable* variable used during construction
    self.layer1 = self._make_layer(width, layers[0])
    self.layer2 = self._make_layer(width * 2, layers[1], stride=2)
    self.layer3 = self._make_layer(width * 4, layers[2], stride=2)
    self.layer4 = self._make_layer(width * 8, layers[3], stride=2)
    embed_dim = width * 32 # the ResNet feature dimension
    self.attnpool = AttentionPool2d(input_resolution // 32, embed_dim, heads,
output_dim)
```

The result from the vision transformer and the text transformer are given to the contrastive learning model for its self-supervised learning.

FIG. 2B illustrates an example of prediction of an oil pool in a drone image. The method now generates a positive and negative prompt (such as 'oil pool versus' no oil pool). By comparing the model output for the positive and negative prompts, the self-supervised method computes a probability score, and this can be used to classify its presence in the drone image. Examples of the code for this may be:

```
def run_single_prediction(image_labels, template, model, loader, softmax_eval=True,
context_length=77):
    """
    FUNCTION: run_single_prediction
    --------------------------------------
    This function will make probability predictions for a single template
    (i.e. "has { }").
    args:
        * image_labels - list, labels for a specific zero-shot task. (i.e. ['Leak',...])
        * template - string, template to input into model.
        * model - PyTorch model, trained clip model
        * loader - PyTorch data loader, loads in drone images
        * softmax_eval (optional) - Use +/- softmax method for evaluation
        * context_length (optional) - int, max number of tokens of text inputted into the model.
```

-continued

```
Returns list, predictions from the given template.
"""

image_phrase = [template]
zeroshot_weights = zeroshot_classifier(image_labels, image_phrase, model,
context_length=context_length)
    y_pred = predict(loader, model, zeroshot_weights, softmax_eval=softmax_eval)
    return y_pred
def predict(loader, model, zeroshot_weights, softmax_eval=True, verbose=0):
    """
    FUNCTION: predict
    --------------------------------
    This function runs the drone images through the model
    and computes the cosine similarities between the images
    and the text embeddings.
    args:
        * loader - PyTorch data loader, loads in cxr images
        * model - PyTorch model, trained clip model
        * zeroshot_weights - PyTorch Tensor, outputs of text encoder for labels
        * softmax_eval (optional) - Use +/- softmax method for evaluation
        * verbose (optional) - bool, If True, will print out intermediate tensor values for
debugging.
    Returns numpy array, predictions on all test data samples.
    """

y_pred = [ ]
    with torch.no_grad( ):
        for i, data in enumerate(tqdm(loader)):
            images = data['img']
            # predict
            image_features = model.encode_image(images)
            image_features /= image_features.norm(dim=-1, keepdim=True) # (1, 768)
            # obtain logits
            logits = image_features @ zeroshot_weights # (1, num_classes)
            logits = np.squeeze(logits.numpy( ), axis=0) # (num_classes,)
            if softmax_eval is False:
                norm_logits = (logits - logits.mean( )) / (logits.std( ))
                logits = sigmoid(norm_logits)
            y_pred.append(logits)
            if verbose:
                plt.imshow(images[0][0])
                plt.show( )
                print('images: ', images)
                print('images size: ', images.size( ))
                print('image_features size: ', image_features.size( ))
                print('logits: ', logits)
                print('logits size: ', logits.size( ))
    y_pred = np.array(y_pred)
    return np.array(y_pred)
```

Figure 3:
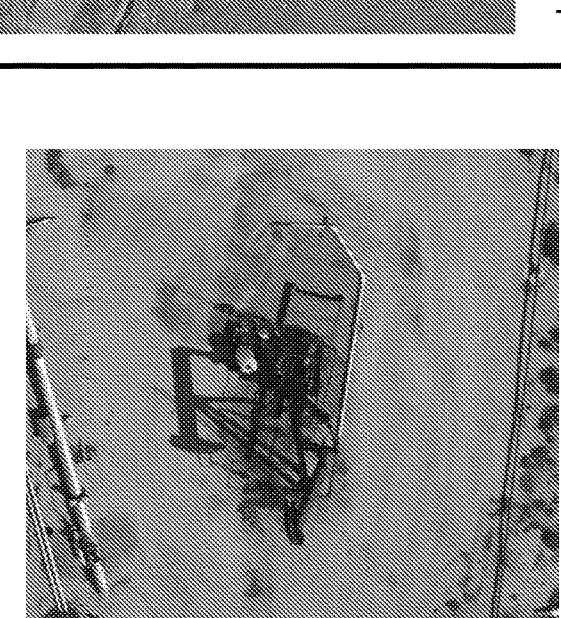
FIG. 3 is an example image.

FIG. 3 is an example of a drone image that might be supplied to as part of the training for the contrastive learning. A set of 5 images are inputs to the Stable Diffusion model, with this image being an example of one of the 5 in the leak category. With 5 sample images, an additional 500 can be generated with leak features for input to an image classifier to learn to classify leaks from the combination of physical and artificial image data.

Figure 4:
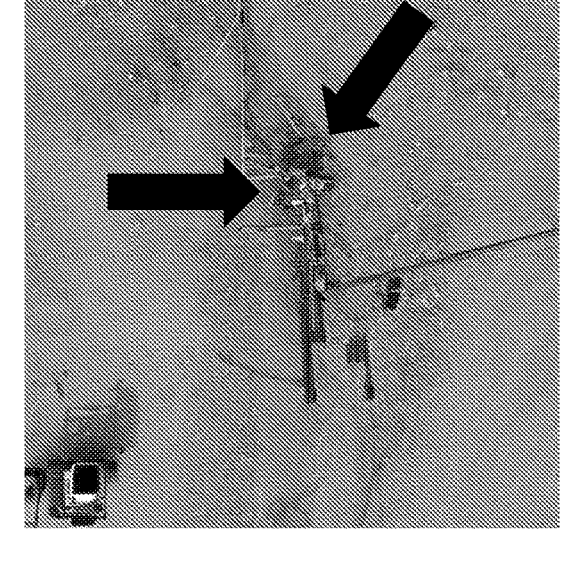
FIG. 4 illustrates a result of a method for identification of features in images obtained by drone inspections compared with a prior art result.

FIG. 4 is an example of the result of presenting the prompt "An zoomed out aerial satellite image of <pump-jack> and <oil-pool> on ground" to a prior art model (left) compared to the result of the same prompt to the trained model. The Stable Diffusion model is trained to learn features of physical assets such as pump jacks and leaks separately, preserving the context of drone inspection images. The combined model is able to generate high quality artificial data for leaks around pump jacks that may appear from drone inspection images. The combination of physical and artificial images is used to train robust image classifiers that are applied to drone images to detect if leaks are present in the images.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of training a model to identify oil pools near pump jacks, comprising:
  a. receiving a CLIP model configured to generate images from text;
  b. using the CLIP model to generate images of pump jacks and images of oil pools;
  c. providing the training pairs comprising the images of pump jacks and the text indicating the pump jacks and the images of oil pools and the text indicating the oil pools to a classification model; and
  d. training the classification model using the training pairs for contrastive learning to generate a refined model.

2. The method of claim 1 further comprising:
  a. providing images obtained by drones to the refined model;
  b. providing a text prompt to the refined model;
  c. generating, via the refined model, probability scores that the images match the text prompt; and
  d. displaying, via a graphical display, images with probability scores greater than 0.5.

3. The method of claim 1 wherein the classification model is a CheXzero model.

4. The method of claim 1 wherein the CLIP model is configured to generate images of pump jacks and images of oil pools.

5. A computer system, comprising:
  one or more processors;
  memory; and one or more programs, wherein the one or more programs are stored in the memory and configured to be executed by the one or more processors, the one or more programs including instructions that when executed by the one or more processors cause the system to:
  a. receive a CLIP model configured to generate images from text;
  b. use the CLIP model to generate images of pump jacks and images of oil pools;
  c. provide the training pairs comprising the images of pump jacks and the text indicating the pump jacks and the images of oil pools and the text indicating the oil pools to a classification model; and
  d. train the classification model using the training pairs for contrastive learning to generate a refined model.

6. The system of claim 5 further including instructions that when executed by the one or more processors cause the system to:
  a. provide images obtained by drones to the refined model;
  b. provide a text prompt to the refined model;
  c. generate, via the refined model, probability scores that the images match the text prompt; and
  d. display, via a graphical display, images with probability scores greater than 0.5.

7. The system of claim 5 wherein the classification model is a CheXzero model.

8. The system of claim 5 wherein the CLIP model is configured to generate images of pump jacks and images of oil pools.

9. A non-transitory computer readable storage medium storing one or more programs, the one or more programs comprising instructions, which when executed by an electronic device with one or more processors and memory, cause the device to:
  a. receive a CLIP model configured to generate images from text;
  b. use the CLIP model to generate images of pump jacks and images of oil pools;
  c. provide the training pairs comprising the images of pump jacks and the text indicating the pump jacks and the images of oil pools and the text indicating the oil pools to a classification model; and
  d. train the classification model using the training pairs for contrastive learning to generate a refined model.

10. The device of claim 9 further including instructions that when executed by the one or more processors cause the device to:
  a. provide images obtained by drones to the refined model;
  b. provide a text prompt to the refined model;
  c. generate, via the refined model, probability scores that the images match the text prompt; and
  d. display, via a graphical display, images with probability scores greater than 0.5.

11. The device of claim 9 wherein the classification model is a CheXzero model.

12. The device of claim 9 wherein the CLIP model is configured to generate images of pump jacks and images of oil pools.

\* \* \* \* \*